United States Patent Office 2,882,171
Patented Apr. 14, 1959

2,882,171

CORROSION INHIBITING COMPOSITION AND METHOD

Wayne L. Denman, Oak Park, Ill., assignor to Dearborn Chemical Company, Chicago, Ill., a corporation of Illinois No Drawing. Application November 14, 1956
Serial No. 622,010

10 Claims. (Cl. 106—14)

The present invention relates to the treatment of metal surfaces to inhibit the corrosion of such surfaces by the corrosive action of aqueous liquids which contact such surfaces. The invention also relates to a new and improved composition particularly adapted for use in corrosion inhibiting methods.

The present invention relates, in part, to a method of protecting the surfaces of metal pipe lines and apparatus which come in contact with water containing dissolved oxygen and carbon dioxide. The invention is applicable to various types of water systems which include steam boiler systems, steam return condensate systems, steam distribution systems, heat transfer systems, evaporator systems, producing oil wells, water injection wells for water flood secondary oil recovery, and the like.

On of the most effective types of compounds previously employed for forming an insulating film about metallic surfaces is a high molecular weight organic amine. The most convenient manner for introducing the compound into the aqueous system would be to prepare a relatively concentrated solution (1% or so) of the acetate salt of the compound in water and then inject the concentrate into the aqueous system. While the salt is considerably more soluble than the compound itself in water, the use of the salt suffers from the disadvantage that such salts are readily hydrolyzable in the aqueous medium to form the free acid which itself presents problems of corrosion. The corrosion caused by the hydrolysis is particularly noticeable at the point of injection of the corrosion inhibitor concentrate into the system because it is at this point that the concentration of the free acid is the greatest.

In my copending application, Serial No. 563,410, filed February 6, 1956, and entitled "Corrosion Inhibition," I have described an improved inhibiting composition which contains an aliphatic amine having film forming properties and a water soluble condensate of at least five moles of ethylene oxide with an aliphatic amine, each aliphatic radical in the two named compounds containing from twelve to twenty carbon atoms. The present application, which is a continuation in part of the aforementioned copending application provides a more extended class of compounds which have been found suitable for use in conjunction with film forming aliphatic amines in the treatment of metallic surfaces to prevent their corrosion by flowing aqueous streams.

An object of the present invention is to provide an improved method for applying thin, insulating films on metallic surfaces to protect the same from corrosion by aqueous liquids.

Another object of the invention is to provide an improved composition for introduction into a water system where corrosion is a problem, said compositions being free from acid radicals which could be an additional source of corrosion.

Another object of the invention is to provide an improved composition for introduction into water systems which is in the form of an emulsion having a relatively high concentration of the film-forming amine in a stable form.

Other and further object and features of the present invention will be apparent to those skilled in the art from the following detailed description.

The corrosion inhibiting compositions of the present invention include, as their essential ingredients, a film-forming aliphatic amine containing from twelve to twenty carbon atoms per molecule and a non-ionic surface active agent containing repeating oxyalkylene groups having no more than three carbon atoms per group and being devoid of long hydrocarbon chains. For best results, the surface active agent should contain at least 15% by weight of oxyethylene groups. These two compounds are combined in the form of a stable, aqueous alkaline dispersion having a pH of from 8.5 to 9.5 which can conveniently be introduced into the water system.

The aliphatic amine which may be employed for the purposes of the present invention may be a material such as lauryl amine, myristyl amine, cetyl amine, stearyl amine, oleyl amine, eicosyl amine, or the like. The most effective amine for the purposes is octadecyl (stearyl) amine.

The non-ionic surface active agent may be any of a wide variety of compounds which are commercially available. One particularly effective class of compounds is that known commercially as the "Tetronics," these being addition products of propylene oxide and ethylene oxide with ethylene diamine. Compounds of this type are prepared in a two-step reaction. In the first step, ethylene diamine is condensed with propylene oxide to a predetermined molecular weight on the order of 2,000 or more. During this condensation, each of the hydrogen atoms of the two amine groups of the diamine combine with propylene oxide, and when a sufficient amount of propylene has reacted, each nitrogen atom has attached to it two oxypropylene chains. The intermediate compound which results is thus a polyoxypropanol derivative of the diamine because each of the oxypropylene chains has a terminal hydroxy group on the end of the radical. The reaction product is then further condensed with ethylene oxide which results in the addition of ethoxy or oxyethylene radicals to the end of each of the four propoxy or oxypropylene chains.

The general structure of this class of compounds can be represented by the following formula:

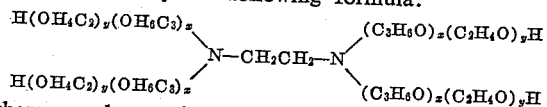

where $x$ and $y$ are integers sufficiently high to provide a molecular weight of at least 3100 for the entire compound. Normally, the value of $x$ will be in the range from about 9 to 17 or more and the value $y$ will be in the range from about 2 to 127 or more.

The following specific compounds in this class have been found to be particularly useful as emulsifying agents for the filming amines:

TABLE 1

| Name | Molecular Weight For Ethylene Diamine-Propylene Oxide Base | Ethylene Oxide Content in Final Product, Weight Percent | Molecular Weight of Final Product |
|---|---|---|---|
| "Tetronic 702" | 2,640 | 25 | 3,570 |
| "Tetronic 904" | 4,030 | 45 | 4,950 |
| "Tetronic 908" | 4,030 | 85 | 25,000 |

Still another class of compounds which is useful for the purposes of the invention consists of block polymer type compounds having a hydrophobic portion consisting of a polypropylene glycol residue and a hydrophilic portion consisting of ethylene oxide linkages. This type of compound is sold commercially by the Wyandotte Chemicals Corporation under the trademark "Pluronic."

Compounds of the foregoing type may be prepared in several manners. One method consists in reacting monomeric propylene glycol with a sufficient amount of propylene oxide to form a polypropylene glycol having the desired molecular weight to be achieved in the hydrophobic portion of the molecule. Alternatively, one mole of water may be reacted with one mole of propylene oxide, resulting in the rupture of the propylene oxide ring to form propylene glycol. Sufficient quantities of propylene oxide are then added to the thus formed propylene glycol in the presence of solid sodium hydroxide as a catalyst until a hydrophobic unit of the proper weight has been built up. This reaction product is then condensed with ethylene oxide in the presence of a strongly alkaline catalyst such as solid sodium hydroxide, at slightly elevated temperatures.

Compounds of this type may be represented by the following general formula:

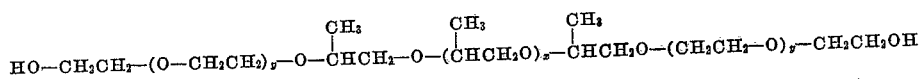

where $x$, representing the repeating hydrophobic building units, has a value of at least 15 and $y$, representing the hydrophilic building units, has the value of at least 3.

Two specific materials falling under this class definition which have been found useful for the purposes of the present invention are itemized below:

TABLE 2

| Name | $x$ | $y$ | Ethylene Oxide Content, Weight Percent | Approximate Molecular Weight |
|---|---|---|---|---|
| "Pluronic L-62" | 22-30 | 3-4 | 25 | 2,000 |
| "Pluronic F-68" | 22-30 | 58-63 | 85 | 7,000 |

Still other non-ionic surface active agents which have been found useful for the purposes of the invention are the polyoxyalkylene glycols manufactured by Carbide and Carbon Chemicals Corporation under the trademark "Ucon." The compound "Ucon 75-H-3000" is a polyoxyalkylene glycol containing ethylene oxide and propylene oxide at random in the polyoxyalkylene chain in a weight ratio of approximately 3 to 1, a molecular weight of about 7000, and a viscosity at 100° F. of approximately 300 S.U.S. The compound "Ucon 75-H-90,000" is a non-ionic surface active agent similar to "Ucon 75-H-3000" in chemical composition, but this compound has a viscosity at 100° F. of approximately 90,000 S.U.S.

The compositions of the present invention may also include other volatile corrosion inhibiting amines such as cyclohexyl amine and morpholine. These compounds are particularly useful for the purpose of protecting against corrosion of metal surfaces immediately above the water level in metal shipping containers and chemical mixing vats, or other water-containing systems. In addition, the volatile amines can be incorporated into the emulsion without impairing the stability of the emulsion while at the same time serving to raise the pH.

The corrosion inhibiting composition is preferably injected into the water system in the form of a stable emulsion in which the active ingredients constitute about 1% by weight of the emulsion. Of the 1%, the weight ratio between the amine and the non-ionic emulsifying agent is preferably in the range from about 1 to 1 to 20 to 1, and more preferably at a ratio of about 10 to 1.

Where an additional amine such as cyclohexyl amine is incorporated, the amount of such amine will be in the range from about 0.5 to 5% by weight of the active ingredients, and preferably at about 1% by weight.

The emulsions can be prepared in a number of different ways. It is desirable to mix the amine such as octadecyl amine with the non-ionic emulsifying agent in the ratio of about 10 to 1, melting the two compounds together, and heating to about 200° F. with stirring. The clear melt thus obtained is then cooled to 170° F. and about 0.1 part of cyclohexyl amine may be added at this point. Stirring is continued until a temperature of about 150° F. is reached.

The mixture produced is then made into an emulsion by adding one part of the mixture to 99 parts of distilled water. The aqueous mixture is then heated to a temperature of about 170° F. with gentle agitation. The source of heat is then removed and gentle agitation is continued until a temperature of about 120° F. is reached.

Alternatively, the solid mixture of the amine and the emulsifier may be mixed with 99 parts of distilled water and heated to a temperature of 170° F., whereupon the mixture is removed from the source of heat and is mixed in a colloid mill until the temperature reaches about 120° F.

The following specific examples illustrate the stabilizing effect of the non-ionic surface active agents on the amine compositions.

*Example 1*

An emulsion was made up containing 1% by weight of active ingredients, the 1% being distributed as follows:

90% octadecyl amine
9% "Tetronic 702"
1% cyclohexyl amine

The emulsion produced in the colloid mill was found to be stable, and had a particle size of 1 to 3 microns. The pH of the emulsion was 8.9. This emulsion retained its stability for extended periods of time and could be readily introduced into the water system without corrosion at the point of introduction.

*Example 2*

Another 1% emulsion was made up substituting the non-ionic emulsifier "Tetronic 904" for the "Tetronic 702" specified in Example 1, in the same amount as previously specified. The emulsion which resulted was stable and had an emulsion particle size of 1 to 5 microns. The pH of the emulsion was 8.8. This composition similarly remained stable for extended periods of time.

*Example 3*

For this example, the compound "Tetronic 908" was employed as the emulsifying agent in the same amounts as given in the preceding examples. The emulsion which resulted was stable, had a particle size of 1 micron, and the emulsion had a pH of 8.7.

*Example 4*

The compound "Pluronic L-62" was employed as the emulsifying agent in the same concentration as previously given. The emulsion which resulted was stable, had an emulsion particle size of 1 to 5 microns and a pH of 9.0.

*Example 5*

For this example, the compound "Pluronic F-68" was employed as the emulsifying agent. It was found that a stable emulsion could be produced without the use of the colloid mill. When the colloid mill was employed, a stable emulsion was produced having a particle size of 1 to 5 microns and a pH of 8.6.

The 1% concentration emulsion can be introduced directly into the steam condensate line if desired, or may be introduced directly into the boiler. Generally, the amount of corrosion inhibiter to be added will be very low, on the order of 2 parts per million of the amine, based upon the steam being generated. The concentration of the amine can be as low as 0.5 part per million in some types of equipment, and it may range as high as 10 parts per million in others. In concentrations in excess of about 10 parts per million, there appears to be no additional benefit derived from these higher concentrations so it is uneconomical to operate at these higher concentrations.

It will be evident that various modifications can be made to the described embodiment without departing from the scope of the present invention.

I claim as my invention:

1. A method of protecting metal contacting surfaces against corrosion by a flowing stream of a corrosive aqueous liquid which comprises adding to said liquid stream an aqueous alkaline dispersion of a film-forming aliphatic amine containing from twelve to twenty carbon atoms per molecule and a non-ionic polyhydric surface active agent containing repeating oxyalkylene groups having no more than three carbon atoms per group, said agent being selected from the group consisting of a polyalkoxylated aliphatic polyamine and a polyoxyalkylene glycol, said agent containing at least 15% by weight of oxyethylene groups, said amine being present in sufficient amount to form a protective film on said metal surfaces and in amounts ranging from 1 to 20 parts by weight of said agent, and flowing said stream past said metal surfaces.

2. The method of claim 1 in which said film-forming amine is octadecyl amine.

3. The method of claim 1 in which said dispersion also includes from 0.5 to 5% by weight of cyclohexyl amine.

4. A stable corrosion inhibiting composition consisting essentially of an aqueous dispersion of a film-forming aliphatic amine containing from twelve to twenty carbon atoms per molecule and a non-ionic polyhydric surface active agent containing repeating oxyalkylene groups having no more than three carbon atoms per group, said agent being selected from the group consisting of a polyalkoxylated aliphatic polyamine and a polyoxyalkylene glycol, said agent containing at least 15% by weight of oxyethylene groups, said amine being present in an amount of from 1 to 20 parts by weight of said agent.

5. A stable corrosion inhibiting composition consisting essentially of an aqueous dispersion of a film-forming aliphatic amine containing from twelve to twenty carbon atoms per molecule, and a non-ionic polyhydric surface active agent containing repeating oxyalkylene groups having no more than three carbon atoms per group, said agent being selected from the group consisting of a polyalkoxylated aliphatic polyamine and a polyoxyalkylene glycol, said agent containing at least 15% by weight of oxyethylene groups, said amine being present in an amount of from 1 to 20 parts by weight of said agent and said dispersion having a pH in the range from 8.5 to 9.5.

6. A stable corrosion inhibiting composition consisting essentially of an aqueous dispersion of octadecyl amine and a non-ionic polyhydric surface active agent containing repeating oxyalkylene groups having no more than three carbon atoms per group, said agent being selected from the group consisting of a polyalkoxylated aliphatic polyamine and a polyoxyalkylene glycol, said agent containing at least 15% by weight of oxyethylene groups, said amine being present in an amount of from 1 to 20 parts by weight of said agent.

7. The composition of claim 6 which also contains from 0.5 to 5.0% by weight of cyclohexyl amine.

8. A stable corrosion inhibiting composition consisting essentially of an aqueous dispersion of octadecyl amine and a non-ionic surface active agent consisting of a polyhydric addition product of ethylene diamine with propylene oxide and ethylene oxide, said addition product containing about 45% by weight of oxyethylene groups, said amine being present in an amount of from 1 to 20 parts by weight of said agent.

9. A stable corrosion inhibiting composition consisting essentially of an aqueous dispersion of octadecyl amine and a non-ionic surface active agent consisting of a polyhydric addition product of propylene glycol with propylene oxide and ethylene oxide, said addition product containing about 85% by weight of oxyethylene groups, said amine being present in an amount of from 1 to 20 parts by weight of said agent.

10. A stable corrosion inhibiting composition comprising an aqueous dispersion of octadecyl amine and a non-ionic polyhydric surface active agent containing at least 15% by weight of oxyethylene groups, said agent being selected from the group consisting of a polyalkoxylated aliphatic polyamine and a polyoxyalkylene glycol, said dispersion containing about 10 parts by weight of said amine for every part by weight of said surface active agent.

References Cited in the file of this patent

UNITED STATES PATENTS

| | | |
|---|---|---|
| 2,460,259 | Kahler | Jan. 25, 1949 |
| 2,674,619 | Lundsted | Apr. 6, 1954 |
| 2,712,531 | Maguire | July 5, 1955 |
| 2,779,741 | Cross | Jan. 29, 1957 |